(12) United States Patent
Magalhães Mendes et al.

(10) Patent No.: US 8,567,110 B2
(45) Date of Patent: Oct. 29, 2013

(54) PROCESS FOR GLASS SEALING OF DYE-SENSITIZED SOLAR CELLS

(75) Inventors: Adélio Miguel Magalhães Mendes, Porto (PT); Joaquim Gabriel Magalhães Mendes, Porto (PT); Helena Isabel Pereira Da Costa Aguilar Ribeiro, Porto (PT); Michael Gratzel, Lausanne (CH); Luisa Manuela Madureira Andrade, Porto (PT); Luís Francisco Moreira Gonçalves, Porto (PT); Carlos Albino Veiga Da Costa, Porto (PT)

(73) Assignee: Efacec Engenharia e Sistemas S.A., Maia (PT)

( * ) Notice: Subject to any disclaimer, the term of this patent is extended or adjusted under 35 U.S.C. 154(b) by 0 days.

(21) Appl. No.: 13/133,127

(22) PCT Filed: Dec. 4, 2009

(86) PCT No.: PCT/IB2009/055511
§ 371 (c)(1),
(2), (4) Date: Aug. 22, 2011

(87) PCT Pub. No.: WO2010/064213
PCT Pub. Date: Jun. 10, 2010

(65) Prior Publication Data
US 2011/0306161 A1    Dec. 15, 2011

(51) Int. Cl.
*H01L 21/00*    (2006.01)
(52) U.S. Cl.
USPC ...................................... 43/66; 257/E31.117

(58) Field of Classification Search
USPC .............................. 438/15, 66; 257/E31.117
See application file for complete search history.

(56) References Cited

U.S. PATENT DOCUMENTS

| | | | |
|---|---|---|---|
| 4,190,950 A | 3/1980 | Skotheim | |
| 5,525,440 A | 6/1996 | Kay et al. | |
| 6,300,559 B1 * | 10/2001 | Ohmori | ......................... 136/263 |

(Continued)

FOREIGN PATENT DOCUMENTS

| | | |
|---|---|---|
| CN | 1444294 A | 9/2003 |
| JP | 2004-172048 A | 6/2004 |

(Continued)

OTHER PUBLICATIONS

International Search Report for PCT/IB2009/055511 dated Mar. 23, 2010.

*Primary Examiner* — Bradley K Smith
*Assistant Examiner* — Caleb Henry
(74) *Attorney, Agent, or Firm* — Kenealy Vaidya LLP

(57) ABSTRACT

The presently disclosed subject matter describes a new sealing process of a specific type of photovoltaic cells named dye-sensitized solar cells. Currently, the sealing of these cells is made by means of a polymer, which connects the two electrode substrates made of glass, isolating the cell's inner content from the outside. The glass-based sealing method has the advantage of enhancing the cell's lifetime. However, glass sealing should not lead to the heating of the whole cell, which may cause its degradation. The process here unveiled employs a string of a glass precursor, a powder or a paste, that bounds the cell's entire external perimeter. The glass precursor string is then heated to its melting point with a laser beam, allowing the two substrates of the cell to stick together.

20 Claims, 1 Drawing Sheet

(56) References Cited

U.S. PATENT DOCUMENTS

Figure 1:
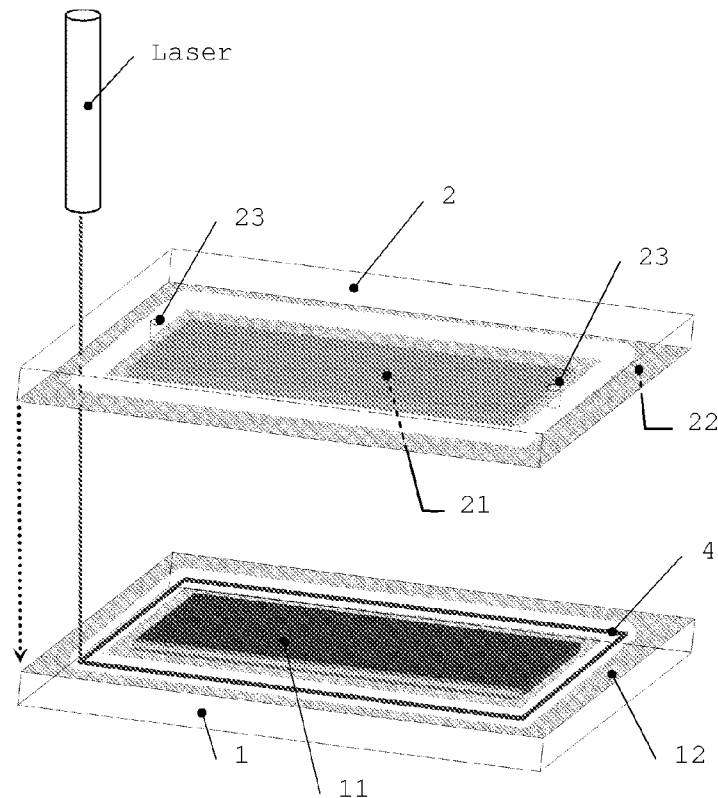

| | | | |
|---|---|---|---|
| 6,469,243 B2* | 10/2002 | Yamanaka et al. | 136/263 |
| 6,479,745 B2* | 11/2002 | Yamanaka et al. | 136/263 |
| 6,693,377 B1 | 2/2004 | Mueller et al. | |
| 6,998,776 B2* | 2/2006 | Aitken et al. | 313/512 |
| 7,019,138 B2* | 3/2006 | Elliott et al. | 546/2 |
| 7,019,209 B2* | 3/2006 | Spivack et al. | 136/263 |
| 7,145,071 B2* | 12/2006 | Spivack et al. | 136/263 |
| 7,407,423 B2* | 8/2008 | Aitken et al. | 445/25 |
| 7,737,356 B2* | 6/2010 | Goldstein | 136/251 |
| 7,851,699 B2* | 12/2010 | Yamanaka et al. | 136/256 |
| 7,992,411 B2* | 8/2011 | Boek et al. | 65/33.6 |
| 2001/0004901 A1* | 6/2001 | Yamanaka et al. | 136/263 |
| 2004/0112421 A1* | 6/2004 | Spivack et al. | 136/256 |
| 2005/0019559 A1* | 1/2005 | Peiffer et al. | 428/336 |
| 2005/0046338 A1* | 3/2005 | Park | 313/504 |
| 2007/0164672 A1* | 7/2007 | Omura et al. | 313/512 |
| 2007/0204906 A1* | 9/2007 | Abe et al. | 136/263 |
| 2008/0072954 A1* | 3/2008 | Chang et al. | 136/251 |
| 2009/0242017 A1* | 10/2009 | Yasuda | 136/252 |
| 2009/0250104 A1* | 10/2009 | Inoue et al. | 136/256 |
| 2009/0297862 A1* | 12/2009 | Boek et al. | 428/428 |

FOREIGN PATENT DOCUMENTS

| | | |
|---|---|---|
| JP | 2007-42460 A | 2/2007 |
| JP | 2007-48504 A | 2/2007 |
| JP | 2007-48674 A | 2/2007 |
| JP | 2007-73401 A | 3/2007 |
| JP | 2007-87684 A | 4/2007 |
| JP | 2008-115057 A | 5/2008 |
| WO | 93/18532 A1 | 9/1993 |
| WO | 02/16277 A1 | 2/2002 |
| WO | 04/000745 A1 | 12/2003 |
| WO | 2004/092566 A2 | 10/2004 |
| WO | 2006/095639 A1 | 9/2006 |
| WO | 2007/067402 A2 | 6/2007 |
| WO | WO 2007067402 A2 * | 6/2007 |
| WO | 2008/093962 A1 | 8/2008 |
| WO | WO 2008093962 A1 * | 8/2008 |

* cited by examiner

PROCESS FOR GLASS SEALING OF DYE-SENSITIZED SOLAR CELLS

This application is a U.S. national phase filing under 35 U.S.C. §371 of PCT Application No. PCT/IB2009/055511 filed Dec. 4, 2009, claiming priority under §119 to Portuguese patent application No. 104282, filed Dec. 5, 2008, the entire disclosures of which are hereby incorporated by reference herein.

TECHNICAL DOMAIN

The presently disclosed subject matter concerns a DSC (dye-sensitized solar cell) glass-based sealing process by means of a laser beam.

Herein described is an innovative sealing process that uses a glass precursor of very low melting point (350° C. to 700° C.) or low melting point (650° C. to 990° C.) and high absorbance on the near infra-red light spectrum region. A laser beam is used to induce the glass fusion, consequently sealing the solar cell.

STATE OF ART

In 1991 Brian O'Regan and Michael Grätzel[2][3] developed a new fabrication process for DSCs, which allowed to achieve more than 7% efficiency. Since then, DSCs are considered a low-cost promising alternative amongst a whole set of photovoltaic technologies[2][3][4][5][6][7].

DSCs are composed by two glass sheets coated by a transparent conducting oxide (TCO) that act as substrate of the two electrodes: the photoelectrode (PE) and the counter-electrode (CE), interconnected by a conducting ionic liquid—the electrolyte. The photoelectrode consists of or comprises a nanoporous layer of titanium dioxide, deposited onto the TCO coated glass, with a dye monolayer adsorbed on its surface. In the counter-electrode a catalyst layer is deposited onto the conducting glass substrate. The electrolyte is typically an organic solvent containing the iodide/triiodide couple as the redox system.

The working principle of these cells is rather simple. The incident photons are absorbed by the dye molecules and their electrons are excited. The photoexcited electrons are then injected into the semiconductor's conduction band. Due to the diode proprieties of the semiconductor (titanium dioxide), the injected electrons percolate toward the conducting glass sheet. Electrons flow through the external circuit in the direction of the counter-electrode, producing electric work in the way. On the catalyst's surface, at the counter-electrode, electrons reduce the triiodide ions of the electrolyte to iodide. Then, the iodide ions diffuse toward the photoelectrode where they are reduced back to triiodide by transferring electrons to the dye, which was previously photo-oxidized. The conversion cycle of solar to electric energy is therefore completed without any chemical compound being consumed in the process.

The transition of this laboratory/pilot scale concept to an industrial production scale is occurring slowly and gradually. Such a delay can be explained, mainly, by problems related to efficiency losses on the long-term, i.e. cells aging. Such problems are normally related to the volatile and corrosive nature of the electrolyte and also to the $TiO_2$ and dye susceptibility to atmospheric moisture and oxygen[8].

In the present context, DSCs are sealed by means of polymeric resins, which under heat and pressure work as sealants. The commercial products most commonly used are Surlyn® and Bynel®, both from DuPont™, and Torr Seal® from Varian™. In the last years several other sealants for DSCs application were "patented", particularly in China and Japan[9][10][11][12][13]. Among all these polymers, the one most used is Surlyn®, with several different methods of application. According to Petterson[14], the DSC modules are sealed at 100° C. and approximately 0.2 bar absolute pressure for about 40 minutes, although other application methodologies can be applied. The main difference between the method described by Petterson and other methodologies lays on the sealing time. In fact, the sealing time and the temperature to which the cell is exposed limit its future performance. In cases where the dye adsorption in the semiconductor surface—coloration step—is performed before sealing the cell, the sealing time varies, in average, between 20 and 180 seconds. This way, the thermal degradation of the dye is minimized. By the same reason, and contrarily to the procedure described by Peterson, it is a common practice to introduce the electrolyte after the sealing step.

Moreover, the temperature's negative effect is also visible on polymeric sealants. Despite these materials offer good mechanical stability, they do not prevent in a long-term period the diffusion of atmospheric moisture and oxygen to the inner space of the cell and the leakage of chemical compounds. Such fact is due not only to the material's intrinsic porosity, but also due to the thermal degradation that DSCs have to face when exposed to solar radiation. In these conditions, a temperature above 60° C. is easily attained. Moreover, above this temperature the polymeric materials start to degrade[15], considerably and irreversibly, increasing the cell's permeability to contaminants and chemical compounds.

Another sealing method, used for instance in the fabrication process of OLEDs (organic light-emitting diodes), can include employing metallic solders (patent WO/2004/092566)[16]. However, this kind of soldering is not very stable with temperature. Such fact is due to the difference between the thermal expansion coefficients of the two materials involved, i.e. glass and metal[17]. Bearing in mind the temperature reached by a DSC when this is exposed to normal sunlight conditions, it is clearly understood that this sealing method is not the most appropriate.

In February 2007, another sealing process of DSCs was unveiled. In this process only the photoelectrode is made of transparent glass[18]. Moreover, the counter-electrode has a barrier made of the same material as itself, which limits the cell's active area. A resin is then applied over this barrier and fused with a laser beam, sealing the cell. The laser beam strikes the cell vertically through the photoelectrode glass in order to fuse the sealing resin. When it cools down, the resin solidifies sealing the two electrodes together. A second document, from the same authors, unveils a very similar process in which a resin or glass act as sealing agents[19]. The sealant is applied over the counter-electrode (cathode) and a laser beam is applied vertically through the photoelectrode (anode), raising the sealant temperature, fusing it and, consequently, sealing the cell.

More recently, the use of glass frits has been widely reported. Glass frits are used to seal glass/glass modules, and show very stable thermal, chemical and mechanical properties[17][20][21][22][23][24]. However, in glass/glass sealing, the fusion process demands rather high temperatures. This fact implies that the dye coloration step has to be performed after the sealing process itself. Additionally, common glass frits contain large amounts of lead that can contaminate the catalyst at the counter-electrode[20]. These materials are commonly used in glass sealing processes[25] and, in particular, in the sealing of OLEDs (Organic Light Emitting Diodes), displays, sensors and other optical equipments. As an example, the patent WO/2007/067402, dated from June 2007, describes the sealing process of OLEDs using glass frits made of $Fe_2O_3$ or some rare metallic oxides doped with $Sb_2O_3$—$V_2O_5$—$P_2O_5$[17]. These materials are fused by means of a laser beam of infra-red radiation. However, in order to obtain greater sealant uniformity, a previous pre-sintering step is performed. In this document, the pre-sintering temperature is reported between 390° C. and 415° C., and the process takes about 2 hours. According to the sintering method described[17], this temperature is significantly lower than the one generally used (~600° C.), but still too high to be applied in DSCs. This document corresponds to EP 2006838615, dated from September 2007, and JP 2007550595, dated from July 2007.

The sealing process proposed in the present document distinguishes itself from all the processes previously mentioned. In fact, the presently disclosed subject matter is characterized by the use of glass, or glass frits, of low or very low melting points; by avoiding heating the electrodes above the temperature of thermal stability of all the constituents present in the moment of sealing; by avoiding a long-term exposition of those constituents to high temperatures—negative aspect of e.g. patent WO/2007/067402; and, finally, by fusing the sealant and consequently sealing the solar cell by means of a laser beam after the pre-heating step of both electrodes to such a temperature that does not damage the cell's active components.

Since the manufacturing of DSCs comprises the use of volatile substances and components that react with oxygen and other agents present in the atmosphere, the sealing system must be effective, resistant to the atmospheric conditions and to the electrolyte's corrosive action. According to what has been previously mentioned, nowadays Surlyn® or Bynl® polymeric films are almost exclusively used in the sealing of DSCs. These systems have two disadvantages: they have a quite fast aging when they are exposed to the environment and to sunlight; as they are based on polymeric films they present higher permeability to volatile agents or gases, leading to precipitate aging processes. A way to overcome this problem is by using a fused glass border, which safely delimits the cell's active area. Fused glass is impermeable to the mentioned chemical species and stable under sunlight and atmospheric air. Additionally, it also acts as an electric insulator. The question lays, however, in how to solder the two glass substrates in order to encapsulate all the components of the cell, without degrading them. The present document reveals an innovative process for sealing DSCs by means of a glass string and a laser beam.

DETAILED DESCRIPTION OF EXEMPLARY EMBODIMENTS

Sealing plays an important role in the stability/aging of DSCs because it makes the cell's inner components isolated from external contaminants and avoids the loss of important chemicals. The ideal sealing material should be: i) stable at working conditions—under great solar irradiance and outdoor ambient conditions; ii) inert to all the chemical components of the cell, mainly the electrolyte redox couple; iii) impermeable to the cell's chemical compounds and to the atmospheric oxygen and moisture, as well as to other atmospheric contaminants; iv) an electric insulator; v) a low-cost material and vi) suitable for simple deposition, which does not affect the correct operation of the cell.

The fabrication method of DSCs is well known and is described in many bibliographic references[3][14][24][26][27][28]. Two sheets of glass coated with an electric conducting material (p.e. $SnO_2$:F), usually denoted as TCO (transparent conducting oxide), are used as substrates for both the photoelectrode and the counter-electrode. The coated glass plates have high optical transmission (>80%) and low ohmic resistance (<10Ω). In the photoelectrode a layer of $TiO_2$ paste is applied and sintered at 450° C. On the other hand, the counter-electrode is heated to a temperature between 385° C. and 420° C., for about 20 to 30 minutes, allowing the sintering of the catalyst. An electric current collector grid is also deposited onto the glass substrates in order to harvest the produced power. After all these steps, the photoelectrode is sealed together with the counter-electrode.

The sealing process here unveiled is performed by the deposition of a glass string on a grooved perimeter at the cell's photoelectrode. The furrow facilitates the deposition of the glass precursor and ensures a greater mechanical stability across the sealing area. In this area, the TCO can be removed to make the sealing process more effective. The glass precursor deposition is performed after print-screening the titanium dioxide. After sintering the titanium dioxide, the temperature is maintained at a certain desired level, but not above the maximum resistance limit of all components of the electrodes[15][29]. Therefore, the photoelectrode is cooled down to a temperature close to that of the counter-electrode, between 385° C. and 420° C. The sealing glass precursor, at room temperature, is then deposited over the photoelectrode's glass sheet and the adhesion process between the sealant material and the electrode substrate starts. The counter-electrode, coated with the catalyst and the current collector grid, is placed on top of the photoelectrode glass substrate at a high temperature. The TCO can also be removed in the sealing perimeter of the counter-electrode. The initial heating of both glass substrates, caused by the semiconductor and the platinum catalyst sintering step, facilitates the glass precursor adhesion to the mentioned glass sheets. This DSC manufacturing process optimization avoids a long heating step suggested in patent WO/2007/067402. The union of the photoelectrode and the counter-electrode is made in such a way that allows the two electrodes to be spaced by a pre-defined constant distance along the entire sealing perimeter, normally achieved with a metallic frame. In order to perform the soldering process with permanent adhesion of the sealant glass precursor to the glass sheets of the two electrodes it is necessary that, after the contact between the two glass sheets, the temperature raises up to the soldering temperature. However, the cell's inner components cannot be destroyed. This extra temperature raise is then achieved by using a laser that strikes the counter-electrode perpendicularly. When crossing the counter-electrode, the beam strikes the glass precursor string causing its fusion and avoiding the over-heating of the remaining part of the cell.

The sealing glass precursor must have some particular features including a low melting point. The electrodes glass has a melting point between 1000° C. and 1200° C.[30], depending on its composition. However, it is possible to obtain glass with much lower melting points (between 350° C. and 700° C.) and lower melting points (650° C. and 990° C.)[31]. The glass precursor deposition can be performed in two ways: using a glass paste[31][32] or a glass powder[31]. The first strategy is based on a simple deposition method but has the disadvantage of possible contamination of the cell. The contaminants can be removed using a nitrogen flow through the holes performed in the counter-electrode—FIG. 2.

In order to achieve an effective soldering of the glass string to the glass substrate by the laser beam, the laser has to emit a radiation with wavelength at which the glass string is opaque. This strategy allows that the laser beam crosses the counter-electrode and heats the glass string, according to a temperature program advised by the glass manufacturer. On the other hand, if the sealing glass has a quite low melting point, the glass does not need to be fully opaque to the laser beam since even a low or a medium absorbance level is enough to cause the desired heating.

After soldering the electrodes, the cell should cool down, after what the dye and the electrolyte are introduced in the cell through the small holes in the counter-electrode side[26]. These holes need to be closed after the entire addition of the cell's components. For that, a small amount of glass sealing precursor is deposited over the holes and the subsequent fusion using a laser beam is performed. In this step is better to use a glass opaque to the laser beam wavelength. It also important to mention that the thermal expansion coefficients of the sealing glass precursor and the electrodes' glass should be quite similar, i.e. about $(8.6-9.2) \times 10^{-6}/°C$. (in the temperature range of 50° C. to 350° C.).

EXAMPLE 1—DSC Sealing with a Glass Paste of Very Low Melting Point

This example shows the use of a specific kind of glass precursor and the respective application strategy. The selected glass sealing precursor is an aluminum-borosilicate which contains lead. It has a melting point of 566° C. and a medium viscosity of $10^3$ Pa·s. A string of this glass paste, with a diameter of 1 mm, was applied along the external perimeter of a DSC with 7 cm long and 5 cm wide. In the photoelectrode glass substrate was created a small incision for a better definition of the glass paste string. After sintering the titanium dioxide semiconductor deposited onto the photoelectrode glass plate, this was quickly heated from 450° C. up to 520° C., at a rate of 10° C. per minute. The sealing glass precursor is immediately deposited along the entire incision made at the glass plate kept at 520° C. A constant temperature period, between 385° C. and 420° C., should be achieved after the deposition. This cooling step is crucial to avoid an overheating of the counter-electrode when it contacts the photoelectrode glass substrate. The counter-electrode, also prepared with an incision along the soldering line, was then placed on top of the photoelectrode at a temperature of 385° C. A small aluminum frame guarantees a constant 30 µm distance between the photoelectrode and counter-electrode glass sheets. From the counter-electrode's side, a 120 W medium power laser diode of 1064 nm wavelength strikes perpendicularly the sealing glass precursor. The laser beam passes through the DSC perimeter several times until all the gas bubbles formed during the glass fusing process disappear and, consequently, the correct soldering of the cell takes place. At the end of the procedure the cell is left to cool down to room temperature, while a nitrogen flow is used to remove potential contaminants introduced during the sealing process. This nitrogen flow was introduced in the cell through the holes previously made in the counter-electrode glass plate for the subsequent introduction of dye and electrolyte.

EXAMPLE 2—DSC Sealing with a Glass Paste of Low Melting Point and Absorption at 1100 nm This example shows the use of a glass precursor of low melting point and opaque to infra-red radiation. The glass precursor paste is a silicate that contains iron oxide ($Fe_2O_3$), has no lead compounds, has a melting point of about 990° C. (medium viscosity of $10^3$ Pa·s) and presents an absorption peak at 1100 nm. A string made of this glass paste, with a diameter of 1 mm, was applied along the external perimeter of a DSC with 7 cm long and 5 cm wide.

In the photoelectrode glass substrate was created a small incision for a better definition of the glass paste string. After sintering the titanium dioxide semiconductor deposited onto the photoelectrode glass plate, this was quickly heated from 450° C. up to 520° C., at a rate of 10° C. per minute. The sealing glass precursor is immediately deposited along the entire incision made at the glass plate kept at 520° C. A constant temperature period, between 385° C. and 420° C., should be achieved after the deposition. This cooling step is crucial to avoid an overheating of the counter-electrode when it contacts the photoelectrode glass substrate. The counter-electrode, also prepared with an incision along the soldering line, was then placed on top of the photoelectrode at a temperature of 385° C. A small aluminum frame guarantees a constant 30 µm distance between the photoelectrode and counter-electrode glass sheets. From the counter-electrode's side, a 120 W medium power laser diode of 1064 nm wavelength strikes perpendicularly the sealing glass precursor. The laser beam passes through the DSC perimeter several times until all the gas bubbles formed during the glass fusing process disappear and, consequently, the correct soldering of the cell takes place. At the end of the procedure the cell is left to cool down to room temperature, while a nitrogen flow is used to remove potential contaminants introduced during the sealing process. This nitrogen flow was introduced in the cell through the holes previously made in the counter-electrode glass plate for the subsequent introduction of dye and electrolyte.

FIGURES DESCRIPTION

FIG. 1 presents, in a non limitative way, a scheme of an exemplary embodiment of a sealing method. In particular the referred figure shows:

1. A transparent conducting sheet of glass (TCO), the DSC photoelectrode substrate;
2. A transparent conducting sheet of glass (TCO), the DSC counter-electrode substrate;
4. The sealant of the two electrodes (material: glass precursor, a glass paste or a glass powder, of low or very low melting point);
11. Semiconductor of titanium dioxide with adsorbed dye.
12. Layer of TCO consisting of or comprising fluor-doped tin oxide.
21. Platinum catalyst.
22. Layer of TCO consisting of or comprising fluor-doped tin oxide.
23. Small holes for injection of electrolyte and dye.

Figure 2:
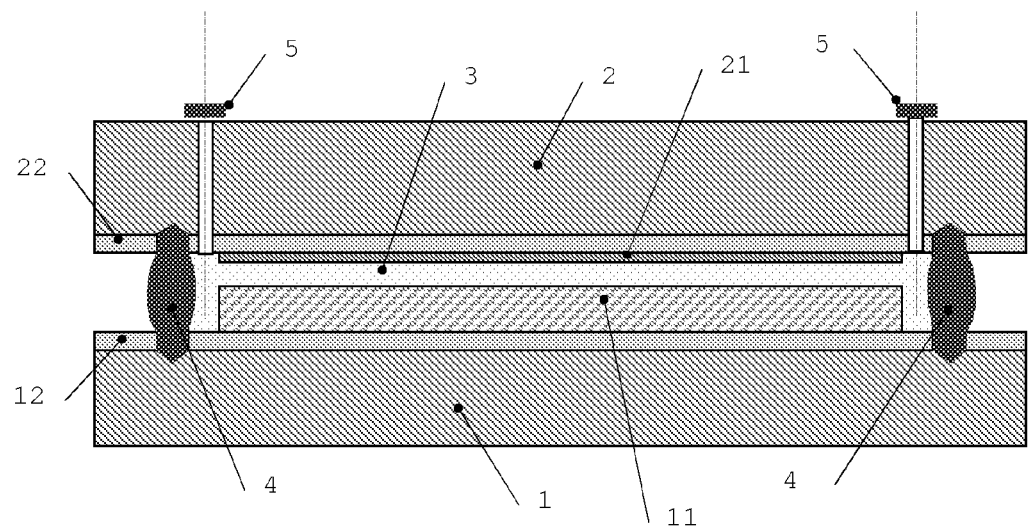

FIG. 2 presents a longitudinal cut of a sealed DSC, in addition to what was described in FIG. 1:

3. Electrolyte;
5. The sealant of the hole made at the counter-electrode side for the injection of dye and electrolyte. (material: glass precursor, a glass paste or a glass powder, of low and very low melting point).

The process of sealing the photoelectrode (1), containing the semiconductor (11), and the counter-electrode (2) occurs by means of a sealant (4) applied in the external perimeter of the glass sheet of the photoelectrode (1). The counter-electrode (2) is placed on the top of the photoelectrode (1) substrate. The sealing process occurs when the laser crosses the counter-electrode perpendicularly (2) causing the fusion of the sealant (4) placed between the electrodes (1) and (2).

The sealing of the hole, created to inject the electrolyte and the dye into the cell, is made by depositing a small amount of glass sealant (5) in the hole area and then fusing this material (5) with a laser beam.

The glass precursor with very low melting point can be the paste 8596 (devitrifying solder glass) or the powder glass 8465 (vitreous solder glass) from Schott[31]. The glass precursor with low melting point can be the glass paste 8516 (IR-absorbing sealing glass), also from Schott[31].

The laser used to perform the sealing process has a maximum power higher than 100 W in the wavelength range between 1000 nm and 1200 nm.

In order to use the referred glass materials, the respective operational limitations, reported by the manufacturer, should be taken into account. This way, the photoelectrode has to be heated between 450° C. and 520° C.; the counter-electrode has to be heated between 385° C. and 420° C.; the glass precursor string has to be applied in the photoelectrode; and the laser beam has to be applied from the counter-electrode glass substrate side.

References

[1] T. Skotheim; "Dye-sensitized Solar Cells"; U.S. Pat. No. 4,190,950, 1980.

[2] B. O'Regan, M. Grätzel; "A Low-Cost, High-Efficiency Solar-Cell Based on Dye-Sensitized Colloidal $TiO_2$ Films"; Nature, 353, pg. 737, 1991.

[3] A. Kay, M. Grätzel, B. O'Regan; "Process for Producing a Photoelectrochemical Cell and a Cell thus Produced"; WO9318532, 1993.

[4] S. S. Hegedus, A. Luque; "Status, Trends, Challenges and the Bright Future of Solar Electricity from Photovoltaics" em *Handbook of Photovoltaic Science and Engineering*, editado por S. S. Hegedus e A. Luque, John Wiley & Sons, Ltd, 2003.

[5] K. Hara, H. Arakawa; "Dye-sensitized Solar Cells", em *Handbook of Photovoltaic Science and Engineering*, editado por S. Hegedus e A. Luque, John Wiley & Sons, Ltd, 2003.

[6] M. Grätzel, K. Kalyanasundaram; "Artificial photosynthesis: Efficient dye-sensitized photoelectrochemical cells for direct conversion of visible light to electricity"; Current Science, 66(10), 706-714, 1994.

[7] F.-T. Kong, S.-Y. Dai, and K.-J. Wang; "Review of Recent Progress in Dye-Sensitized Solar Cells"; Advances in OptoElectronics, vol. 2007, 13 pp., 2007. (doi:10.1155/2007/75384).

[8] E. Figgemeier, A. Hagfeldt; "Are dye-sensitized nanostructured solar cells stable? An overview of device testing and component analyses"; International Journal of Photoenergy, 6, 127-140, 2004.

[9] K. Wang, S. Dai, Y. Sui; "Sealing Method of Dye Sensitized Solar Cell"; CN1444294, 2003.

[10] H. Mikuni, K. Kishi, T. Onoguchi; "Sealing Material Composition for Dye-sensitized Solar Cell"; WO2006095639, 2006.

[11] H. Nakagawa, Y. Yabuuchi; "Sealing Material for Dye-sensitized Solar Cell"; JP2007048504, 2007.

[12] K. Hiwatari, N. Masuyama; "Sealing Structure of Dye-sensitized Solar Cell"; JP2007073401, 2007.

[13] K. Kishi; "Sealing Agent for Dye-sensitized Solar Cell"; JP2007087684, 2007.

[14] H. Petterson, T. Gruszecki, L. Johansson, P. Johander; "Manufacturing method for monolithic dye-sensitised solar cells permitting long-term stable low-power modules"; Solar Energy Materials & Solar Cells, 77, 405, 2003.

[15] A. Hinsch, J. Kroon, R. Kern, I. Uhlendorf, J. Holzbock, A. Meyer, J. Ferber; "Long-term Stability of Dye-Sensitised Solar Cells"; Progress in Photovoltaics: Research and Applications, 9, 425, 2001.

[16] M. Anandan; "Metal Seal Packaging for Organic Light Emitting Diode Device"; WO/2004/092566, 2004.

[17] L. A. Lamberson; "Glass Package that is Hermetically Sealed with a Frit and Method of Fabrication"; WO/2007/067402, 2007.

[18] G. Ichiro, O. Yasuo, E. Satoshi, T. Atsuya, F. Keizo; "Dye-sensitized Solar Cell and its Sealing Method"; JP2007042460, 2007.

[19] G. Ichiro, O. Yasuo, E. Satoshi, T. Atsuya, F. Keizo; Dye-sensitized Solar Cell and its Sealing Method; JP2007048674, 2007.

[20] R. Sastrawan, J. Beier, U. Belledin, S. Hemming, A. Hinsch, R. Kern, C. Vetter, F. M. Petrat, A. Prodi-Schwab, P. Lechner, W. Hoffmann; "New Interdigital Design for Large Area Dye Solar Modules Using a Lead-free Glass Frit Sealing"; Progress in Photovoltaics: Research and Applications, 14, 697, 2006.

[21] W. J. Leea, E. Ramasamya, D. Y. Leea, J. S. Song; "Glass frit overcoated silver grid lines for nano-crystalline dye sensitized solar cells"; Journal of Photochemistry and Photobiology A: Chemistry, 183, 1-2, 133-137, 2006.

[22] A. Hinsch, U. Belledin, H. Brandt, F. Einsele, S. Hemming, D. Koch, U. Rau, R. Sastrawan, T. Schauer; "Glass Frit Sealed Dye Solar Modules with Adaptable Screen Printed Design"; 2006 IEEE 4th World Conference on Photovoltaic Energy Conversion; Vol 1, pp. 32-35, Waikoloa, Hawaii, Maio de 2006.

[23] R. Sastrawan, J. Beier, U. Belledin, S. Hemming, A. Hinsch, R. Kern, C. Vetter, F. M. Petrat, A. Prodi-Schwab, P. Lechner, W. Hoffmann; "A glass frit-sealed dye solar cell module with integrated series connections"; Solar Energy Materials and Solar Cells, 90(11), 1680-1691, 2006.

[24] J. M. Kroon, N. J. Bakker, H. J. P. Smit, P. Liska, K. R. Thampi, P. Wang, S. M. Zakeeruddin, M. Grätzel, A. Hinsch, S. Hore, U. Würfel, R. Sastrawan, J. R. Durrant, E. Palomares, H. Pettersson, T. Gruszecki, J. Walter, K. Skupien, G. E. Tulloch; "Nanocrystalline dye-sensitized solar cells having maximum performance"; Progress in Photovoltaics: Research and Applications, 15(1), 1-18, 2006.

[25] O. Steigelmann, T. R. Mulderij, H. A. M. van Hal; "Glass frit and method for sealing glass surfaces together"; WO/2004/000745, 2004.

[26] M. Späth, P. M. Sommeling, J. A. M. van Roosmalen, H. J. P. Smit, N. P. G. van der Burg, D. R. Mahieu, N. J. Bakker and J. M. Kroon; "Reproducible Manufacturing of Dye-Sensitized Solar Cells on a Semi-automated Baseline"; Progress in Photovoltaics: Research and Applications, 11(3), 207-220, 2003.

[27] M. Grätzel; "Dye-sensitized solar cells", J. Photochemistry and Photobiology C: Photochemistry Reviews, 4, 145, 2003.

[28] M. Grätzel, "Solar Energy Conversion by Dye-Sensitized Photovoltaic Cells"; Inorganic Chemistry, 44, 6841, 2005.

[29] Y. Tanaka, M. Suganuma; "Effects of Heat Treatment on Photocatalytic Property of Sol-Gel Derived Polycrystalline TiO2"; Journal of Sol-Gel Science and Technology, 22, 1-2, 83-89, 2001.

[30] J. Buckett, J. S. Marsh, A. C. Ton; "Soda-lime-silica glass compositions"; WO/2002/016277, 2002.

[31] "Technical Glass Handbook"; http://www.us.schott.com/epackaging/english/download/schott_techn_glaeser_us.pdf, site Access in April of 2008.

[32] F. Vollkommer, F. Zwaschka, U. Mueller; "Dielectric layer for discharge lamps and corresponding production method"; U.S. Pat. No. 6,693,377, 2004.

The invention claimed is:

1. Sealing process of photovoltaic solar cells sensitized by dye comprising glass sheets that form a photoelectrode and a counter-electrode, wherein the process comprises the sequential steps of:
   i. placing the photoelectrode at a temperature high enough to ensure glass adhesion and low enough to ensure no damage occurs to the photoelectrode;
   ii. thereafter applying a glass precursor cord at an external perimeter of an inner part of the photoelectrode;
   iii. thereafter placing the photoelectrode and the counter-electrode at temperatures high enough to ensure glass adhesion and low enough to ensure no damage occurs to either the photoelectrode or the counter-electrode; and
   iv. thereafter welding the photoelectrode and the counter-electrode closed by using a laser beam,
   wherein the glass sheets of the photoelectrode and the counter-electrode are transparent to the laser beam wavelength used for welding.

2. Sealing process of DSC glass solar cells according to claim 1, further comprising as preparatory steps to the process of claim 1: sintering the photoelectrode and maintaining the photoelectrode at a sintering temperature after being sintered; after sintering, bringing the photoelectrode from the sintering temperature to a welding temperature between 385° C. and 420° C.

3. Sealing process of DSC glass solar cells according to claim 2, further comprising: heating the photoelectrode to a temperature between 450° C. and 520° C., before applying the glass precursor cord.

4. Sealing process of DSC glass solar cells according to claim 3, wherein said heating the photoelectrode is at a rate of approximately 10° C. per minute.

5. Sealing process of DSC glass solar cells according to claim 1 further comprising: placing both the photo-electrode and counter-electrode at a temperature between 385° C. and 420° C., before closing and welding by the laser beam.

6. Sealing process of DSC glass solar cells according to claim 1, wherein bonding between the photoelectrode and the counter-electrode is made such that the two electrodes are spaced apart by a predefined and constant distance along an entire welding perimeter, the distance being achieved by means of a metallic frame, the welding taking place with permanent adhesion of the sealing glass precursor cord to two glass sheets of the photoelectrode by use of a laser beam that heats ups the glass precursor cord.

7. Sealing process of DSC glass solar cells according to claim 6, wherein said distance is approximately 30 micrometer.

8. Sealing process of DSC glass solar cells according to claim 1, wherein the glass precursor is made of at least one of a glass powder and a glass welding paste with a melting point between 350° C. and 700° C.

9. Sealing process of DSC glass solar cells according to claim 1, wherein the glass precursor has a low melting point between 650° C. and 990° C., and is a paste based on an iron oxide silicate ($Fe_2O_3$) or a powder glass with the same features, wherein both materials are opaque in the near infra-red region.

10. Sealing process of DSC glass solar cells according to claim 1, wherein the laser has a maximum power in the wavelength range between 1000 nm and 1200 nm.

11. Sealing process of DSC glass solar cells according to claim 1, wherein the laser has a maximum power above 100 W.

12. Sealing process of DSC glass solar cells according to claim 1, wherein the laser beam is applied over the counter-electrode, the laser beam having a wavelength such that an absorbance level of the said glass cord is sufficient to allow it to heat up to the desired temperature.

13. Sealing process of DSC glass solar cells according to claim 10, wherein the laser has a maximum power above 100 W.

14. Sealing process of DSC glass solar cells according to claim 1, further comprising: heating the photoelectrode to a temperature between 450° C. and 520° C., before applying the glass precursor cord.

15. Sealing process of DSC glass solar cells according to claim 14, wherein said heating the photoelectrode is at a rate of approximately 10° C. per minute.

16. Sealing process of DSC glass solar cells according to claim 2 further comprising: placing both the photo-electrode and counter-electrode at a temperature between 385° C. and 420° C., before closing and welding by the laser beam.

17. Sealing process of DSC glass solar cells according to claim 14 further comprising: placing both the photo-electrode and counter-electrode at a temperature between 385° C. and 420° C., before closing and welding by the laser beam.

18. Sealing process of DSC glass solar cells according to claim 2, wherein bonding between the photoelectrode and the counter-electrode is made such that the two electrodes are spaced apart by a predefined and constant distance along an entire welding perimeter, the distance being achieved by means of a metallic frame, the welding taking place with permanent adhesion of the sealing glass precursor cord to two glass sheets of the photoelectrode by use of a laser beam that heats ups the glass precursor cord.

19. Sealing process of DSC glass solar cells according to claim 14, wherein bonding between the photoelectrode and the counter-electrode is made such that the two electrodes are spaced apart by a predefined and constant distance along an entire welding perimeter, the distance being achieved by means of a metallic frame, the welding taking place with permanent adhesion of the sealing glass precursor cord to two glass sheets of the photoelectrode by use of a laser beam that heats ups the glass precursor cord.

20. Sealing process of DSC glass solar cells according to claim 1, wherein the glass precursor is made of at least one of a glass powder and a glass welding paste with a melting point between 350° C. and 700° C.

* * * * *